April 14, 1953 J. C. BARTCH ET AL 2,634,713
COOLING SYSTEM FOR INTERNAL-COMBUSTION ENGINES
Filed March 18, 1950 2 SHEETS—SHEET 1

INVENTORS
JAMES C. BARTCH
GEORGE W. COUCH
BY John H. Cassidy
ATTORNEY

April 14, 1953  J. C. BARTCH ET AL  2,634,713
COOLING SYSTEM FOR INTERNAL-COMBUSTION ENGINES
Filed March 18, 1950  2 SHEETS—SHEET 2
FIG. 3.
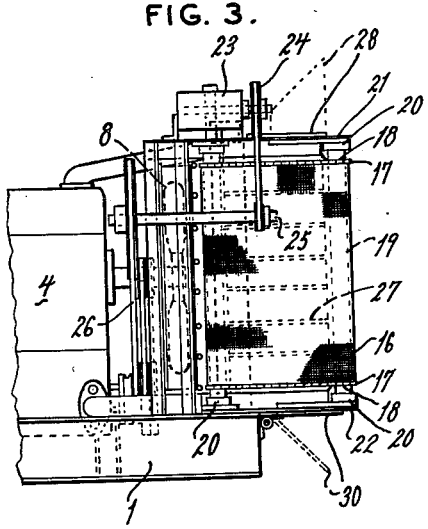
FIG. 4.
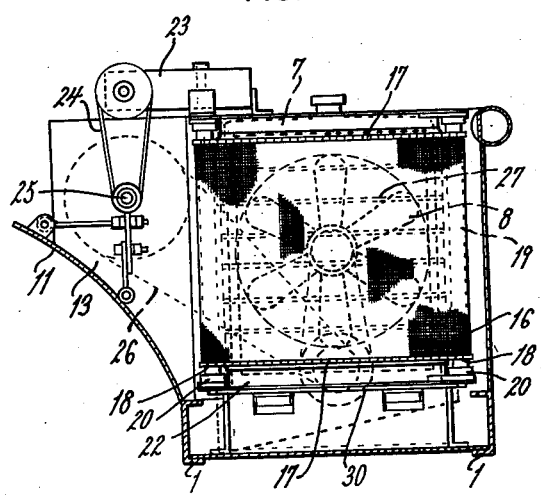
FIG. 5.
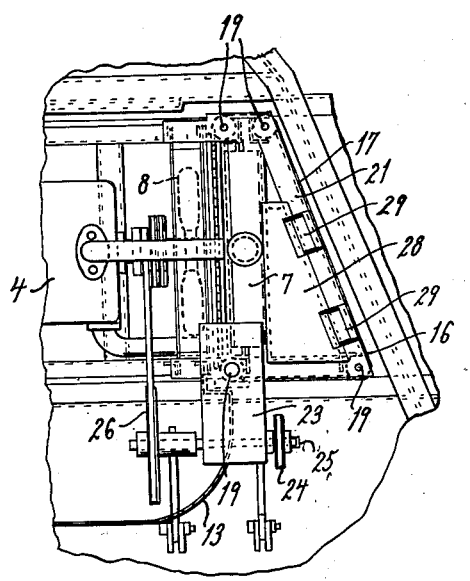
FIG. 6.
FIG. 7.
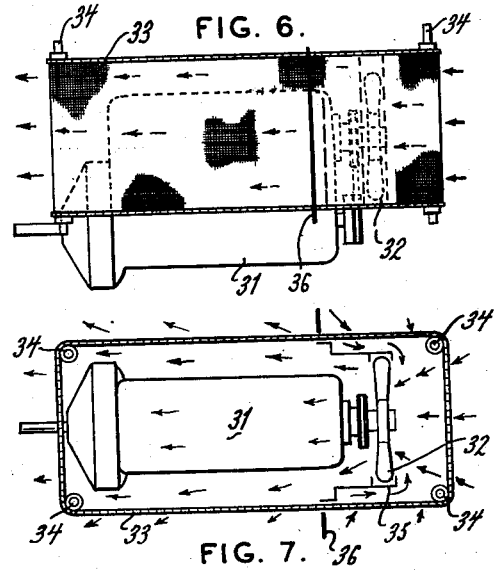
INVENTORS
JAMES C. BARTCH
GEORGE W. COUCH
BY
ATTORNEY Patented Apr. 14, 1953

2,634,713

UNITED STATES PATENT OFFICE 2,634,713

COOLING SYSTEM FOR INTERNAL-COMBUSTION ENGINES

James C. Bartch, Flat River, and George W. Couch, Rivermines, Mo.

Application March 18, 1950, Serial No. 150,472

8 Claims. (Cl. 123—41.49)

This invention pertains to cooling systems for internal combustion engines, particularly where operating in localities where the cooling air available is laden with foreign matter which would clog the cooling surfaces if allowed to reach them.

Such engines, when applied to farm machinery, road machinery and the like, must often work under conditions wherein the air is laden with straw, lint and other debris thrown up by the operation of the machine. This invention is directed to means for cleaning the air of such debris before applying it to the cooling surfaces.

In the following description, taken with the accompanying drawings, an illustrative embodiment of this invention will be set forth. It is to be understood, however, that this invention is susceptible of various embodiments, within the scope of the appended claims, without departing from the principles or spirit of the invention.

In the accompanying drawings,

Fig. 3 is an enlarged detail rear view of part of the machine with portions of the superstructure removed;

Fig. 4 is a side view of Fig. 3;

Fig. 5 is a plan view of Fig. 3;

Fig. 6 is a side view of an engine and screen illustrating another embodiment of this invention; and Fig. 7 is a plan view of Fig. 6.

Figure 1:
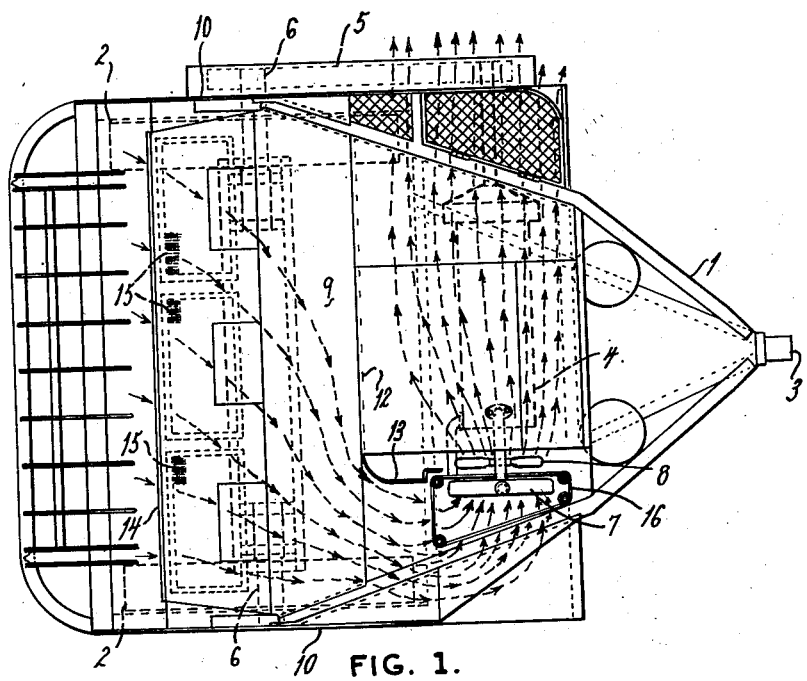
Fig. 1 is a plan view of a road machine having an engine and cooling system embodying this invention.
Figure 2:
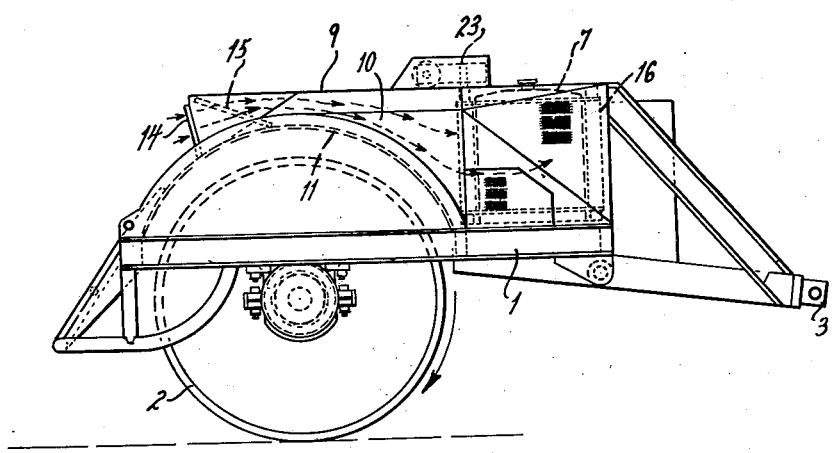
Fig. 2 is a side view of the machine of Fig. 1.

The embodiment illustrated in the drawings is employed in connection with a vehicle termed a "sprout destroyer" used in road making and similar operations to clear the ground by destroying growing vegetation, brush, and the like. The vehicle comprises a chassis 1 suitably mounted on ground wheels 2 and provided with a drawbar 3 for attachment to a tractor for hauling the vehicle. An engine 4 is mounted on the chassis 1 and connected by a chain drive 5 to a shaft 6 journalled in the hubs of the wheels 2. The shaft 6 may be equipped with rotary beaters, not shown, such as flexible chains, or the like, which, rotating with the shaft, operate to destroy the growing vegetation by attrition. This mechanism is described in our application Serial No. 579,466, filed February 23, 1945, now Patent 2,597,053, May 20, 1952.

The engine shown in Figs. 1 to 5 is of the water-cooled type having a radiator 7. A fan 8, mounted in front of the radiator and driven by the engine in the usual manner, operates to blow a draught of cooling air through said radiator so as to pass over the cooling surfaces thereof. The upper portion of the vehicle is enclosed by a top 9, side walls 10 and an arched bottom wall 11, of sheet metal or the like, to form an air intake duct leading to the radiator 7. This duct is separated from the engine compartment by a wall 12 terminating in a baffle 13. A screen 14, which may be in sections not shown, is arranged to span the intake duct at the entrance thereof at the rear of the vehicle. A second screen 15, which also may be in sections as shown in Fig. 1, spans the duct at a point between the screen 14 and the radiator 7. The screen 15 is of smaller mesh than the screen 14.

A flexible screen 16, made in the form of an endless belt, is mounted at its edges on roller chains 17 which pass over sprockets 18 on supporting guide spindles 19 journalled in bearings 20 on an upper screen frame 21 and a lower screen frame 22. As may be seen in Fig. 1, wherein one top plate is removed, these guide spindles 19 are positioned so as to support the endless screen in a circuit extending around the radiator 7. The arrangement is such that a portion of this screen extends across the air intake duct so as to be traversed by the incoming air before it reaches the radiator. This portion of the screen will intercept foreign matter carried by the air draught and prevent it from entering the radiator. The other portion of the screen passes around behind the radiator so as to be traversed in reverse direction by the air leaving the radiator. One of the spindles 19 is driven, through a variable speed gear box 23, by suitable driving connections, such as the belt 24, countershaft 25 and belt 26 from the engine crankshaft.

In the operation of this embodiment of the invention, the endless screen 16 is driven by the connections 23, 24, 25 and 26 so as to travel in the circuit established by the guides 19 to pass in front of the radiator 7 and thereafter in a return path behind it. The fan 8 sets up a draught of air entering the intake duct through the screens 14 and 15, then through the traveling screen 16 in one direction, through the radiator, and again through the screen 16 in the reverse direction, as indicated by arrows in Figs. 1 and 2. Any debris carried by the air draught is screened out progressively, the coarsest particles being taken out by the screen 14, smaller ones by the screen 15 and finally the screen 16, which is of finer mesh than either of the other two, intercepts the smallest particles which lodge in that portion of the screen which is in front of the radiator. Thereafter, as this screen travels in its circuit, the dirt laden portion moves around behind the radiator into the zone of the outgoing air, wherein the draught passes through it in the reverse direction and dislodges the foreign matter which has been intercepted during its travel through the intake zone.

In order to support the traveling screen 16 against the pressure of the incoming air draught a grill 27, of any suitable structure, may be mounted behind the screen between it and the radiator 7. The upper screen frame 21 may be provided with a door 28 hinged at 29 and the lower frame 22 may have a similar door 30. These doors provide access to the radiator core for cleaning off any dirt that may have passed through the screen 16.

In the embodiment shown in Figs. 6 and 7, the invention is applied to an air-cooled engine 31 having a fan 32 for blowing the cooling air. In this case, the endless screen 33 is mounted on guide spindles 34 in the same manner as described above for the screen 16, but these guides are now positioned to establish a circuit extending around the entire engine and the fan. The air draught induced by the fan, indicated by arrows in Fig. 7, passes inward through the screen in the intake zone and, after passing over the cooling surfaces of the engine, passes out again in the discharge zone. One or more baffles 35 and 36 may be mounted adjacent the fan and the screen to separate these zones more definitely from each other. This engine and screen assembly is mounted on the forward part of the vehicle in the position of the engine 4 in Figs. 1 and 2.

It will be seen that this invention provides effective means for protecting the cooling surfaces of the engine to which the cooling air is applied, whether these surfaces are those of the engine itself or those of the radiator in a water-cooled engine, from accumulation of dirt and debris which is usually carried by the air in localities where these machines must operate. The arrangement whereby the air passes through the screen first in one direction to clean the air and thereafter in the reverse direction to clean the screen insures that the screen is maintained in a clean condition so as to be efficient for its purpose over extended periods of time. This avoids frequent stoppages for cleaning. Thus, keeping the screen in a clean condition also prolongs its life and reduces the hazard of allowing it to stand for a prolonged period with an accumulation of dirt which may cause corrosion.

We claim:

1. In combination with an internal combustion engine having a fan arranged to blow a draught of air over the cooling surfaces thereof, an endless screen, a plurality of guides supporting said screen for travel in a circuit extending around said cooling surfaces, said guides being positioned so that said screen traveling in said circuit passes through the intake zone to said surfaces wherein said screen is positioned to intercept foreign material carried by the incoming air and thereafter through the discharge zone from said surfaces wherein such foreign material is dislodged from said screen by the outgoing air, and driving connections for moving said screen in said circuit.

2. In combination with an internal combustion engine having a fan arranged to blow a draught of air over the cooling surfaces thereof, an endless screen, a plurality of guides supporting said screen for travel in a circuit extending around said cooling surfaces, said guides being positioned so that said screen traveling in said circuit passes through the intake zone to said surfaces wherein said screen is positioned to intercept foreign material carried by the incoming air and thereafter through the discharge zone from said surfaces wherein said foreign material is dislodged from said screen by the outgoing air, an air intake duct leading to said intake zone, a second screen of larger mesh than said first screen spanning said duct in advance of said first screen, and driving connections for moving said first screen in said circuit.

3. In combination with an internal combustion engine having a fan arranged to blow a draught of air over the cooling surfaces thereof, an endless screen, a plurality of guides supporting said screen for travel in a circuit extending around said cooling surfaces, said guides being positioned so that said screen traveling in said circuit passes through the intake zone to said surfaces wherein said screen is positioned to intercept foreign material carried by the incoming air and thereafter through the discharge zone from said surfaces wherein such foreign material is dislodged from said screen by the outgoing air, an air intake duct leading to said intake zone, a plurality of screens spanning said duct in advance of said first screen positioned to be traversed successively by the incoming air draught and of successively smaller mesh but of larger mesh than said first screen, and driving connections for moving said first screen in said circuit.

4. In combination with an internal combustion engine having a radiator and a fan arranged to blow cooling air through said radiator, an endless screen, supporting guides for said screen arranged to position the same for travel in a circuit extending around said radiator, and driving connections for moving said screen in said circuit.

5. In combination with an internal combustion engine having a radiator and a fan arranged to blow cooling air through said radiator, an endless screen, supporting guides for said screen arranged to position the same for travel in a circuit extending around said radiator, a baffle separating the intake zone of said radiator from the discharge zone thereof adjacent said screen, and driving connections for moving said screen in said circuit.

6. In combination with an air-cooled internal combustion engine having a fan arranged to blow air over the cooling surfaces thereof, an endless screen, supporting guides arranged to position said screen for travel in a circuit extending around said engine and fan so that the incoming air to said fan traverses said screen in one direction and thereafter the outgoing air traverses said screen in the opposite direction, and driving connections for moving said screen in said circuit.

7. In combination with an air-cooled internal combustion engine having a fan arranged to blow air over the cooling surfaces thereof, an endless screen, supporting guides arranged to position said screen for travel in a circuit extending around said engine and fan so that the incoming air to said fan traverses said screen in one direction and thereafter the out-going air traverses said screen in the opposite direction, a baffle separating the intake zone of said fan from the discharge zone thereof adjacent said screen, and driving connections for moving said screen in said circuit.

8. In combination with an internal combustion engine having a fan arranged to blow a draught of air over the cooling surfaces thereof, an endless screen, a plurality of guides supporting said screen for travel in a circuit extending around said cooling surfaces, said guides being positioned so that said screen traveling in said circuit passes through the intake zone to said surfaces wherein said screen is positioned to intercept foreign material carried by the incoming air and thereafter through the discharge zone from said surfaces wherein such foreign material is dislodged from said screen by the outgoing air, a grill positioned behind said screen in said intake zone to support the same against the draught pressure, and driving connections for moving said screen in said circuit.

JAMES C. BARTCH.
GEORGE W. COUCH.

References Cited in the file of this patent

UNITED STATES PATENTS

| Number | Name | Date |
|---|---|---|
| 914,822 | Goudard et al. | Mar. 9, 1909 |
| 1,257,218 | Griswold | Feb. 19, 1918 |
| 1,301,784 | Calkins | Apr. 22, 1919 |
| 1,432,903 | Reddig | Oct. 24, 1922 |
| 1,711,493 | Fox | May 7, 1929 |
| 2,248,544 | Maruhn | July 8, 1941 |